Figures 1, 2:
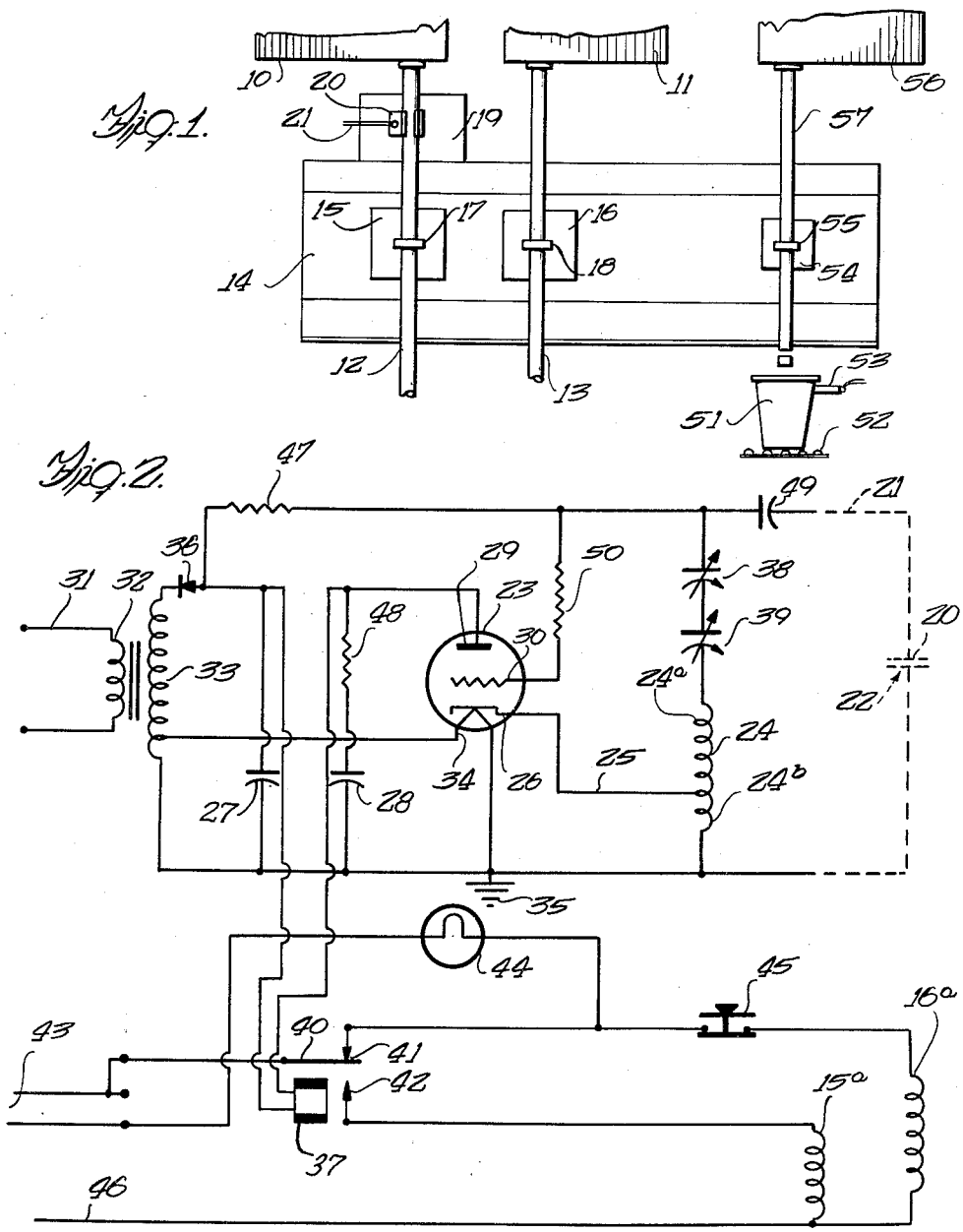

May 8, 1962     J. A. TOTTEN     3,033,422

CONTROL MEANS FOR DISPENSING DEVICE

Filed Feb. 19, 1960

Inventor
John A. Totten
Dawson, Tilton, Fallon & Lungmus
Attorneys

United States Patent Office 3,033,422
Patented May 8, 1962

3,033,422
CONTROL MEANS FOR DISPENSING DEVICE
John A. Totten, Hammond, Ind., assignor, by mesne assignments, to Rock-Ola Manufacturing Corporation, Chicago, Ill., a corporation of Delaware
Filed Feb. 19, 1960, Ser. No. 9,797
3 Claims. (Cl. 222—52)

This invention relates to control means for a dispensing device and, more particularly, to means for regulating and controlling the outflow of liquid in a coin-operated vending machine, such as a coffee dispenser.

In the vending of liquids, such as coffee, through coin-operated machines, it is imperative that the control equipment not only be continuously operative, but that the same be precise in its operation and further be of a nature suited for quick and efficient servicing.

One problem involved in the operation of a coffee-vending machine lies in the continued provision of cream in satisfactory quantities for those users desiring the same. The cream is subject to bacterial degradation, and hence should be desirably replenished daily in fresh containers. On the other hand, the coffee, if brewed by the cup or in small batches, can be stored in sufficient quantity for several days' usage. The cream constitutes an important economic aspect of the machine operation, and there has been a problem in the past in reconciling the need for providing an adequate quantity of cream without oversupplying the same so that excess cream will have to be thrown away.

Another problem in the machine operation resides in satisfying different customers quantity-wise irrespective of the character of the coffee they desire. The art heretofore has been characterized by what is known as the "short cup" for those patrons who desire black coffee. The customer is literally short-changed because the quantity of liquid he receives is less by the amount of cream usually introduced into the coffee cup.

It is an object of this invention to provide a novel control means for a dispensing device, more particularly, one that is capable of solving the problems outlined above. Another object is to provide a control means for vending machines, and the like, in which relatively uncomplicated mechanisms are employed, thereby making the mechanisms readily serviceable, but in which precise and reliable operation is afforded. Still another object is to provide electro-mechanical means for controlling the dispensing of liquids which make feasible the use of inexpensive, disposable piping components so as to preserve a desired sterile operation. Other objects and advantages of this invention can be seen in the details of construction and operation set forth hereinafter.

The invention will be described in conjunction with the accompanying drawing, in which—

FIG. 1 is a fragmentary elevational view of a portion of a coffee-vending machine and which features certain piping and valve elements; and FIG. 2 is a schematic wiring diagram for a circuit associated with the equipment seen in FIG. 1.

In the illustration given, the numerals 10 and 11 designate, respectively, reservoirs for the storage of cream in a coffee-vending machine (not shown). The invention here is adapted to be used with a wide variety of liquid dispensing equipment which, for example, may take the form of the coffee-vending apparatus seen in my Patent No. 2,985,402, issued July 21, 1959.

Each reservoir 10 and 11 is equipped with a discharge conduit, the conduits being seen only in fragmentary form and designated respectively with the numerals 12 and 13 in FIG. 1. In the illustration given, each conduit 12 and 13 has a downward course which lies adjacent to a mounting plate 14 suitably supported within the vending machine. The mounting plate 14 is equipped with a pair of valves 15 and 16, associated respectively with the conduits 12 and 13. The conduits 12 and 13 are preferably of resilient plastic material such as polyvinyl chloride, and are adapted to be clamped or clinched by the valves 15 and 16 so as to close off the conduits 12 and 13 to liquid flow therethrough. For this purpose, the valves 15 and 16 are equipped with clamping elements 17 and 18, respectively, the elements 17 and 18 being conveniently provided as armature extensions in a solenoid-operated valve. The solenoids for the valves 15 and 16 are seen schematically in FIG. 2, where the numeral 15a designates the solenoid coil for the valve 15, and the numeral 16a designates the solenoid winding of the valve 16.

The mounting plate 14 is equipped with an upward projection 19 which is constructed of an electrical insulation material such as a resinous plastic. For this purpose, nylon can be conveniently employed. Anchored to the member 19 is a conduit contacting element 20, to which is attached an electrical lead 21. The lead 21 is schematically represented in FIG. 2, and the element 20 is represented by one plate 20 of the condenser generally designated 22 in FIG. 2.

The circuit seen in the upper section of FIG. 2 is a Hartley oscillator circuit, and includes a triode 23. The oscillator circuit employs a single coil 24 that is tapped by a lead 25 coupled to the cathode 26 of the triode 23. This effectively divides the inductance 24 into two sections—the grid section 24a, and the anode section 24b. The capacitors 27 and 28 effectively isolate the direct current of the power supply to the anode 29 from the cathode and grid 30. The power supply 31 may be a conventional commercial current, i.e., 115 volts A.-C. 60-cycle, single phase, which is applied to the primary of a transformer 32. The secondary 33 of the transformer 32 is split and provides 115 volts A.-C. for the plate 29 of the triode 23 and 6.3 volts for the heater 34, the heater 34 being coupled to ground 35 in conventional fashion.

The alternating current provided by the secondary 33 of the transformer 32 is rectified by a rectifier 36 and applied to the anode 29, a relay coil 37 being interposed therein.

The resonant circuit of the oscillator is defined by the inductance 24, the capacitance 22, and two variable condensers 38 and 39. Condenser 38 provides coarse control, being rated at 480 micromicrofarads, while the condenser 39 provides delicate control, being a 20 micromicrofarad condenser.

The arm 40 of the relay having coil 37 is seen in FIG. 2 and has associated therewith contacts 41 and 42. The relay arm 40 is seen in its normal or deenergized condition. The circuit in the lower portion of FIG. 2 is employed to check the resonant character of the oscillator circuit in FIG. 2, and includes a power source 43. As seen, the power source is connected across a light bulb 44 when the relay arm 40 is in the condition seen, the respective positions of the relay arm providing power to the solenoid coils 15a and 16a, a pushbutton 45 being interposed in the line connecting arm 41 with the solenoid coil 16a. The coils 15a and 16a at their other ends are connected to a conductor 46 which is in turn coupled to the cream-dispensing switch (not shown). Upon energization of the cream switch, the conductor 46 is electrically energized so as to complete the circuit through one or the other of coils 15a or 16a with the power supply 43 and thus provide a desired actuation of the valves 15 or 16, as the case may be.

In the operation of the apparatus, particularly the circuit seen in FIG. 2, the Hartley oscillator will be in a resonant condition whenever liquid exits within conduit 12 in the vicinity of the contact 20. This establishes a predetermined dielectric constant by virtue of a definite capacitance in the capacitor 22 which is partially defined by the contact 20. The other plate of the condenser 22 is effectively the chassis of the apparatus, i.e., ground. It will be appreciated that a different dielectric constant will exist between the contact 20 and the chassis depending upon whether or not liquid is within the portion of the conduit 12 above the clamping member 17. The circuit in FIG. 2 is adjusted so that it will oscillate whenever the liquid level is such as to provide liquid within conduit 12 above the contact 20. During this condition, plate current will flow, energizing the relay coil 37. This shifts the relay arm 40 into contact with the contact 42 and applies power to one side of the coil 15a associated with the solenoid valve 15. Thus, when a signal comes from the cream switch (via line 46), the coil 15a is energized for a time sufficient to release the member 17 from its clamping relation with the conduit 12 and deliver a predetermined amount of cream.

When the reservoir 10 is emptied to the extent that no cream level exists in conduit 12 so as to establish a dielectric constant for the condenser 22 necessary for resonance, plate current ceases to flow and the coil 37 no longer is capable of maintaining the relay arm 40 in contact with the contact 42. In this condition, the relay arm 40 establishes contact with the contact 41 and applies power to one side of the solenoid coil 16a. Thus, when a signal comes from the cream switch (via line 46), the valve 16 has its clamping member 18 released from conduit 13 so as to deliver cream from reservoir 11.

In this fashion, substantially all of the cream from the reservoir 10 will be utilized before the reservoir 11 is employed. This is most desirable, since now it is possible to utilize smaller quantities of cream and substantially minimize wastage. The service operator then merely removes the depleted reservoir container 10, shifts the reservoir 11 to the position formerly occupied by the container 10, and mounts a fresh, filled cream reservoir in the position designated 11 in FIG. 1. This insures that all cream will be utilized from the first installed container or reservoir before the second is tapped.

The circuit in the lower portion of FIG. 2 also affords the service operator an opportunity to reestablish the resonant condition of the oscillator circuit—this being particularly desirable after a change in reservoir containers, since usually this will be accompanied by a change in the conduits 12 and 13. Inasmuch as these conduits may be caked with cream, it is necessary that they be removed either for disposal or cleaning before further use. This means the substitution of a new conduit which might change the dielectric constant somewhat.

Ordinarily, the change in resonant frequency, if any change occurs at all, will be of a minor character and can be satisfactorily compensated for by a minor adjustment in the delicate control variable condenser 39. If a greater change is necessitated, this can be achieved through resetting of the variable condenser 38 in combination with a change in the value of the delicate condenser 39. For this purpose, the light bulb 44 is employed to show when the resonant point is reached.

After the installation of new containers and conduits, the control associated with the variable condenser 39 is turned until the light bulb 44 lights, if the same has not already been illuminated. This corresponds to a non-resonant condition of the oscillator circuit, and has the relay arm 40 positioned as seen in FIG. 2. During this operation, the manual push button 45 is depressed so as to isolate the coils 15a and 16a from the current source 43. It will be appreciated that both valves 15 and 16 could open temporarily if the relay arm 40 were contacting contact 42 by completing a mutual power circuit.

Thereafter, and while the push button 45 is still depressed, the control associated with variable condenser 39 is turned until the light bulb 44 goes out, which indicates that the oscillator circuit is in a resonant condition and that the relay arm 40 contacts contact 42.

Illustrative of the circuit element values suitably employed in the circuit of FIG. 2 are the following: The triode 23 may be a 6C4, and the inductance 24 may be rated at 2.5 mh. at 100 ma. The condensers and resistances may be seen from the following table:

*Table*

| Condenser No. | Value in MMF | Resistance No. | Resistance in Ohms |
| --- | --- | --- | --- |
| 27 | 5 | 47 | 1,000,000 |
| 28 | 5 | 48 | 1,000 |
| 49 | 480 | 50 | 47 |

The oscillator circuit may also be conveniently employed to regulate the filling of a cup 51 positioned on a portion of the chassis 52. The cup has a level-determining contact 53 in engagement with the exterior thereof which provides the same function as the contact 20 relative to the conduit 12. A valve similar to valves 15 and 16 is provided in the form of valve 54 having a clamping contact 55 associated therewith and operated by a solenoid coil not shown, but which is the counterpart of coils 15a and 16a. The coffee reservoir is designated in FIG. 1 by the numeral 56 and has a discharge conduit 57 communicating therewith which is clampingly engaged by the clamping contact 55. The piping from the cream dispenser may be suitably interconnected with the conduit 57 below the valve 54 and irrespective of whether cream is called for by the patron, the valve 54 will be operated by virtue of the contact 53 through an oscillator circuit to provide a full cup.

While in the foregoing specification I have set forth a detailed description of an embodiment of the invention for the purpose of illustration thereof, many variations in the details herein given will be appreciated by those skilled in the art without departing from the spirit and scope of the invention.

I claim:

1. For use in apparatus adapted to dispense liquids, such as coffee vending machine, a pair of liquid storing reservoir means having liquid discharge means associated therewith, a pair of valve means having electrical actuating means associated one with each of said reservoir means for controlling discharge of liquid therefrom, electrical capacitor means contacting one of said reservoir means and having a first capacitance value when liquid is in the vicinity of its area of contact with said one reservoir means and having a second capacitance value when said liquid is not in the vicinity of its said area of contact, oscillator circuit means coupled to said capacitor means and including electrical relay means operable thereby for conditioning the actuating means associated with one of said valve means for operation when said capacitor means has its said first capacitance value and for likewise conditioning the actuating means of the other of said valve means when said capacitor means has its said second capacitance value, and selectively operable switch means in circuit with said actuating means for selectively operating either said valve means for a predetermined time interval when the actuating means respectively associated therewith is conditioned for operation thereby to discharge liquid from both said reservoir means in succession.

2. The combination as set forth in claim 1 in which said oscillator circuit means is conditioned to oscillate in response to said first capacitance value of said capacitor means, means for adjusting said oscillator circuit means to accommodate changes in said first capacitance value, and indicator means for indicating oscillation of said oscillator circuit means.

3. The combination as set forth in claim 1 in which each reservoir means comprises a reservoir tank with its said discharge means comprising a conduit coupled thereto, with the said valve means being operatively associated with said conduit to control the passage of liquid therethrough; and with the said capacitor means having contact with one of said conduits at an area located between the reservoir tank and the said valve means associated therewith.

References Cited in the file of this patent
UNITED STATES PATENTS

| | | |
|---|---|---|
| 2,355,232 | Nelson et al. | Aug. 8, 1944 |
| 2,361,837 | Gilmore | Oct. 31, 1944 |
| 2,409,245 | Black | Oct. 15, 1946 |
| 2,955,726 | Feldman et al. | Oct. 11, 1960 |